US008953541B2

United States Patent
Jang et al.

(10) Patent No.: US 8,953,541 B2
(45) Date of Patent: Feb. 10, 2015

(54) METHOD, USER EQUIPMENT, BASE STATION, AND SYSTEM FOR DETECTING SHARING OF TIMING ADVANCE VALUE

(75) Inventors: Yi Jang, Beijing (CN); Meylan Arnuad, Shenzhen (CN); Yuhua Chen, Beijing (CN); Wei Quan, Beijing (CN); Zhongbin Qin, Shenzhen (CN); Jian Zhang, Shanghi (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 198 days.

(21) Appl. No.: 13/609,045

(22) Filed: Sep. 10, 2012

(65) Prior Publication Data

US 2013/0003682 A1 Jan. 3, 2013

Related U.S. Application Data

(63) Continuation of application No. PCT/CN2011/071645, filed on Mar. 9, 2011.

(30) Foreign Application Priority Data

Mar. 10, 2010 (CN) .............................. 201010129111

(51) Int. Cl.
*H04W 4/00* (2009.01)
*H04W 56/00* (2009.01)
(52) U.S. Cl.
CPC ................................. *H04W 56/0045* (2013.01)
USPC ........................................ 370/329; 370/328
(58) Field of Classification Search
USPC .................................................. 370/329, 328
See application file for complete search history.

(56) References Cited

U.S. PATENT DOCUMENTS

| 5,722,080 A | 2/1998 | Kondo |
| 2006/0072520 A1* | 4/2006 | Chitrapu et al. .............. 370/337 |

(Continued)

FOREIGN PATENT DOCUMENTS

| CN | 101179484 A | 5/2008 |
| CN | 101388722 A | 3/2009 |

(Continued)

OTHER PUBLICATIONS

Extended European Search Report received in European Application No. 11752833.1-2411, Applicant Huawei Technologies Co., Ltd., mailed Dec. 19, 2012, 11 pages.
Huawei, "Issues in carrier aggregation," 3GPP TSG RAN WG1, R1-092377, Los Angeles, USA, Jun. 29-Jul. 3, 2009, 6 pages.
Huawei, "Different Timing Advance Impact on Carrier Aggregation," 3GPP TSG RAN WG2, R2-095815, Miyazaki, Japan, Oct. 12-Oct. 16, 2009, 4 pages.

(Continued)

*Primary Examiner* — Kenny Lin
(74) *Attorney, Agent, or Firm* — Slater & Matsil, L.L.P.

(57) ABSTRACT

Embodiments of the present invention disclose a method, user equipment, base station, and system for detecting sharing of a timing advance value, relate to the field of communications technologies, and solve a problem in the prior art that a normal service cannot be provided because a TA value cannot be shared between different uplink CCs. According to the embodiments of the present invention, the user equipment may determine, through a time offset between synchronization of downlink component carriers corresponding to uplink component carriers, that a too large time offset indicates that a same TA value cannot be shared; the base station may calculate a TA value directly through a dedicated preamble sequence, and then compares the TA value with a TA value of one of the component carriers, where a too large difference between the TA values indicates that a same TA value cannot be shared.

14 Claims, 10 Drawing Sheets

(56) References Cited

U.S. PATENT DOCUMENTS

| | | |
|---|---|---|
| 2009/0141701 A1 | 6/2009 | Dalsgaard |
| 2009/0215459 A1* | 8/2009 | Kuo .............................. 455/436 |
| 2011/0051633 A1 | 3/2011 | Pan et al. |
| 2012/0218988 A1* | 8/2012 | Xu et al. ....................... 370/350 |
| 2012/0282969 A1* | 11/2012 | Jiang et al. .................... 455/517 |

FOREIGN PATENT DOCUMENTS

| | | |
|---|---|---|
| CN | 101389121 A | 3/2009 |
| CN | 101444133 A | 5/2009 |
| CN | 101572577 A | 11/2009 |
| CN | 101646234 A | 2/2010 |
| CN | 102026176 A | 4/2011 |
| WO | WO 2007/147788 A1 | 12/2007 |
| WO | WO 2009/061255 A1 | 5/2009 |

OTHER PUBLICATIONS

NTT Docomo, Inc., "CA support for multi-TA," 3GPP TSG-RAN, R2-101567, San Francisco, USA, Feb. 22-26, 2010, 12 pages.

First Office Action of Chinese Application No. 201010129111.4, mailed Mar. 4, 2013, 34 pages (Partial Translation).

"Impact analysis of multiple TA", ZTE, 3GPP TSG RAN WG2 #69, R2-101091, San Francisco, USA, Feb. 22-26, 2010, pp. 1-3.

International Search Report received in Patent Cooperation Treaty Application No. PCT/CN2011/071645, Applicant Huawei Technolgies Co., Ltd. et al., mailed Jun. 16, 2011, 4 pages.

Written Opinion of the International Searching Authority received in Patent Cooperation Treaty Application No. PCT/CN2011/071645, Applicant Huawei Technolgies Co., Ltd. et al., mailed Jun. 16, 2011, 4 pages.

* cited by examiner

METHOD, USER EQUIPMENT, BASE STATION, AND SYSTEM FOR DETECTING SHARING OF TIMING ADVANCE VALUE

CROSS-REFERENCE TO RELATED APPLICATIONS

This application is a continuation of International Application No. PCT/CN2011/071645, filed Mar. 9, 2011, which claims priority to Chinese Patent Application No. 201010129111.4, filed Mar. 10, 2010, both of which applications are incorporated herein by reference.

TECHNICAL FIELD

The present invention relates to the field of communications technologies, and in particular, to a method, user equipment, base station, and system for detecting sharing of a timing advance value.

BACKGROUND

In a procedure of transmitting an uplink signal of a communication system, an eNodeB (eNB, base station) adjusts a TA (Timing Advance, timing advance) value of a UE (User Equipment, user equipment) according to an offset status of the uplink signal, so that each UE sends the uplink signal according to its adjusted TA value, and uplink signals sent by all UEs under the eNodeB can synchronously reach the eNodeB.

In a communication system with a CA (Carrier Aggregation, carrier aggregation) characteristic introduced, a UE may communicate with the eNodeB through multiple CCs (Component Carrier, component carrier) in an uplink or a downlink. In a general case, all uplink CCs of the same UE may share one TA value. Therefore, in the prior art, the eNodeB adjusts the TA value only by referring to a signal sent by any one of all the uplink CCs of the UE and supply the adjusted TA value to all the uplink CCs of the UE for use.

In a procedure of implementing that all the uplink CCs of the same UE share one TA value, the inventors find that the prior art at least has the following problem: in a practical application, offset status of all the uplink CCs of the same UE may not be completely the same, which results in that all the uplink CCs of the same UE cannot share one TA value. For example, when a frequency selection Repeater (repeater) or an RRH (Remote Radio Heads, remote radio unit) is deployed in a network, if a signal on one or several certain CCs of the UE is amplified by the frequency selection repeater or forwarded by the RRH and a signal on another one or several CCs is not amplified by the frequency selection repeater and not forwarded by the RRH, or signals on different CCs of the same UE are amplified by different frequency selection repeaters or forwarded by different RRHs, uplink CCs passing through one of the frequency selection repeaters (or RRHs) or passing through two frequency selection repeaters (or RRHs) separately cannot share the TA value, but uplink CCs not passing through the frequency selection repeater (or RRH) may share the TA value with each other, or uplink CCs passing through the same frequency selection repeater (or RRH) may share the TA value with each other.

The inventors find that, in a communication system with a frequency selection repeater or an RRH, an eNB cannot determine which uplink CCs of one UE may share the same TA value, so the eNB cannot normally provide a carrier aggregation service for the UE.

SUMMARY OF THE INVENTION

Embodiments of the present invention provide a method, user equipment, base station, and system for detecting sharing of a timing advance value, so that an eNB determines uplink CCs in a UE that may share a TA value.

In order to achieve the foregoing objective, the embodiments of the present invention adopt the following technical solutions.

A method for detecting sharing of a timing advance value includes: calculating a time offset between a downlink component carrier corresponding to at least one target uplink component carrier and a downlink component carrier corresponding to a predetermined uplink component carrier; and sending indication information to a base station, so as to indicate that a target uplink component carrier with a time offset greater than a first predetermined threshold cannot share a timing advance value with the predetermined uplink component carrier, and/or a target uplink component carrier with a time offset not greater than the first predetermined threshold can share a timing advance value with the predetermined uplink component carrier.

A method for detecting sharing of a timing advance value includes: detecting a dedicated preamble sequence adopted in a random access procedure executed with a user equipment on at least one target uplink component carrier; calculating a timing advance value of the target uplink component carrier according to the dedicated preamble sequence; calculating a difference between the timing advance value of the target uplink component carrier and a timing advance value of a predetermined uplink component carrier; and determining that a target uplink component carrier with a difference greater than a second predetermined threshold cannot share a timing advance value with the predetermined uplink component carrier, and/or a target uplink component carrier with a difference not greater than the second predetermined threshold can share a timing advance value with the predetermined uplink component carrier.

A user equipment includes: a first calculating unit, configured to calculate a time offset between a downlink component carrier corresponding to at least one target uplink component carrier and a downlink component carrier corresponding to a predetermined uplink component carrier; and a sending unit, configured to send indication information to a base station, so as to indicate that a target uplink component carrier with a time offset greater than a first predetermined threshold cannot share a timing advance value with the predetermined uplink component carrier, and/or a target uplink component carrier with a time offset not greater than the first predetermined threshold can share a timing advance value with the predetermined uplink component carrier.

A base station includes: a first detecting unit, configured to detect a dedicated preamble sequence adopted in a random access procedure executed with a user equipment on at least one target uplink component carrier; a second calculating unit, configured to calculate a timing advance value of the target uplink component carrier according to the dedicated preamble sequence; a third calculating unit, configured to calculate a difference between the timing advance value of the target uplink component carrier and a timing advance value of a predetermined uplink component carrier; and a determining unit, configured to determine that, a target uplink component carrier with a difference greater than a second predetermined threshold cannot share a timing advance value with the predetermined uplink component carrier, and/or a target uplink component carrier with a difference not greater than the second predetermined threshold can share a timing advance value with the predetermined uplink component carrier.

A system for detecting sharing of a timing advance value includes a base station, and a user equipment according to any one of claims 11 to 14, where the base station is configured to configure an uplink component carrier for the user equipment.

A system for detecting sharing of a timing advance value includes a user equipment, and a base station according to any one of claims 15 to 20, where the user equipment is configured to execute a random access procedure with the base station on a target uplink component carrier; and the base station is configured to detect a dedicated preamble sequence adopted by the random access procedure, calculate a timing advance value of the target uplink component carrier according to the dedicated preamble sequence, calculate a difference between the timing advance value of the target uplink component carrier and a timing advance value of a predetermined uplink component carrier, and determine that, a target uplink component carrier with a difference greater than a second predetermined threshold cannot share a timing advance value with the predetermined uplink component carrier, and a target uplink component carrier with a difference not greater than the second predetermined threshold can share a timing advance value with the predetermined uplink component carrier.

According to the method, user equipment, base station, and system for detecting sharing of a timing advance value provided in the embodiments of the present invention, the user equipment or the base station judges whether the user equipment having multiple uplink component carriers can share a TA value, so that the base station performs corresponding processing, for example, deleting configuration of an uplink component carrier incapable of sharing the TA value, or not allowing an uplink component carrier incapable of sharing the TA value to be configured. Specifically speaking, the user equipment may determine, through a time offset between synchronization of downlink component carriers corresponding to uplink component carriers, that a too large time offset indicates that the same TA value cannot be shared; the base station may calculate a TA value directly through a dedicated preamble sequence, and then compares the TA value with a TA value of one of the component carriers, where a too large difference between the TA values indicates that the same TA value cannot be shared.

According to the embodiments of the present invention, the base station or the user equipment can distinguish which uplink CCs may share the TA value, so that the base station deletes the configuration of the uplink CC incapable of sharing the TA value. In this way, the base station can normally provide a carrier aggregation service for the UE. In a normal case, the base station provides the carrier aggregation service for uplink CCs capable of sharing the TA value.

BRIEF DESCRIPTION OF THE DRAWINGS

To illustrate the technical solutions in the embodiments of the present invention or in the prior art more clearly, accompanying drawings needed for describing the embodiments or the prior art are briefly introduced below. Obviously, the accompanying drawings in the following descriptions are merely some embodiments of the present invention, and persons of ordinary skill in the art may obtain other accompanying drawings according to these accompanying drawings without making creative efforts.

DETAILED DESCRIPTION OF ILLUSTRATIVE EMBODIMENTS

Figure 1:
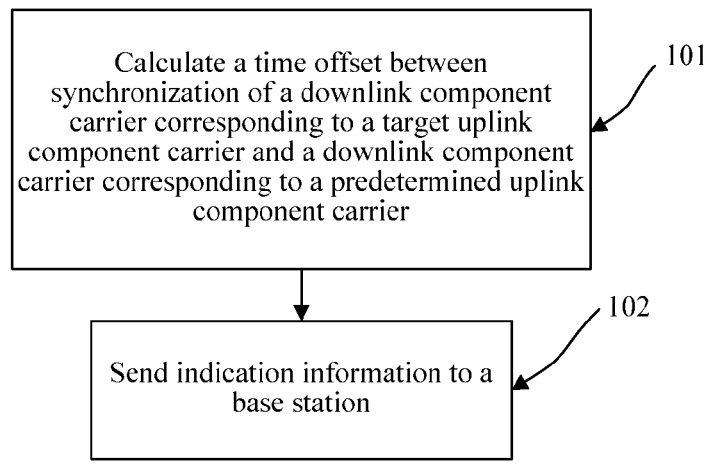
FIG. 1 is a flow chart of a method for detecting sharing of a timing advance value according to an embodiment of the present invention.

An embodiment of the present invention provides a method for detecting sharing of a timing advance value. As shown in FIG. 1, the method includes:

101: Calculate a time offset between synchronization of a downlink component carrier corresponding to a target uplink component carrier and a downlink component carrier corresponding to a predetermined uplink component carrier.

102: Send indication information to a base station, so as to indicate that a target uplink component carrier with a time offset greater than a first predetermined threshold cannot share a timing advance value with the predetermined uplink component carrier, and a target uplink component carrier with a time offset not greater than the first predetermined threshold can share a timing advance value with the predetermined uplink component carrier. After receiving the indication information, the base station may perform corresponding processing, for example, deleting configuration of the uplink component carrier incapable of sharing the TA value, or not allowing the uplink component carrier incapable of sharing the TA value to be configured.

Figure 2:
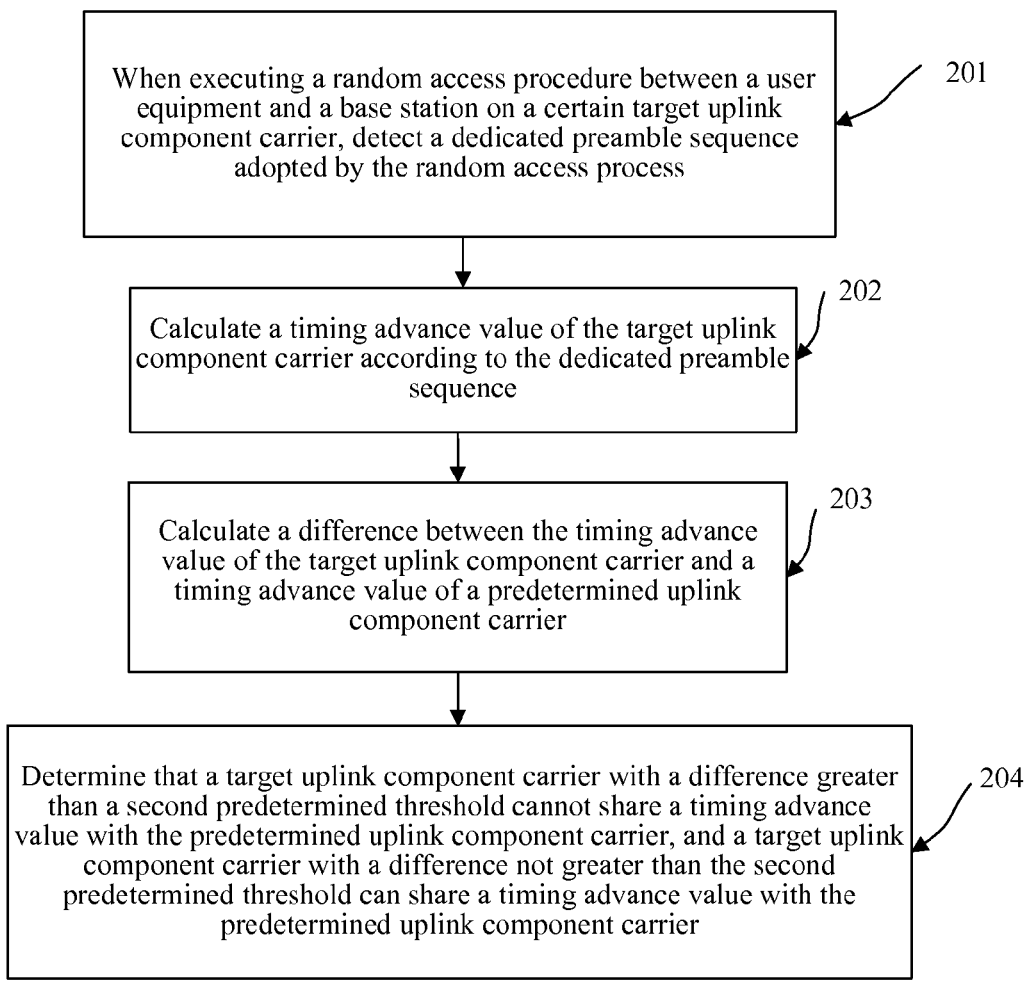
FIG. 2 is a flow chart of another method for detecting sharing of a timing advance value according to an embodiment of the present invention.

An embodiment of the present invention further provides a method for detecting sharing of a timing advance value. As shown in FIG. 2, the method includes:

201: When executing a random access procedure on a certain target uplink component carrier between a user equipment and a base station, detect a dedicated preamble sequence adopted by the random access procedure.

202: Calculate a timing advance value of the target uplink component carrier according to the dedicated preamble sequence.

203: Calculate a difference between the timing advance value of the target uplink component carrier and a timing advance value of a predetermined uplink component carrier.

204: Determine that a target uplink component carrier with a difference greater than a second predetermined threshold cannot share a timing advance value with the predetermined uplink component carrier, and a target uplink component carrier with a difference not greater than the second predetermined threshold can share a timing advance value with the predetermined uplink component carrier.

Figure 3:
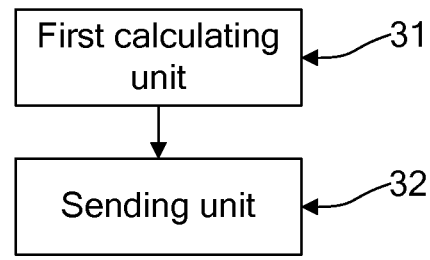
FIG. 3 is a block diagram of a user equipment according to an embodiment of the present invention.

An embodiment of the present invention provides a user equipment. As shown in FIG. 3, the user equipment includes a first calculating unit 31 and a sending unit 32.

The first calculating unit 31 is configured to calculate a time offset between synchronization of a downlink component carrier corresponding to a target uplink component carrier and a downlink component carrier corresponding to a predetermined uplink component carrier. The sending unit 32 is configured to send indication information to a base station, so as to indicate that a target uplink component carrier with a time offset greater than a first predetermined threshold cannot share a timing advance value with the predetermined uplink component carrier, and a target uplink component carrier with a time offset not greater than the first predetermined threshold can share a timing advance value with the predetermined uplink component carrier.

The user equipment provided in this embodiment together with the base station may form a system for detecting sharing of a timing advance value. In the system, detecting whether uplink component carriers can share the same TA value is mainly completed by the user equipment.

Figure 4:
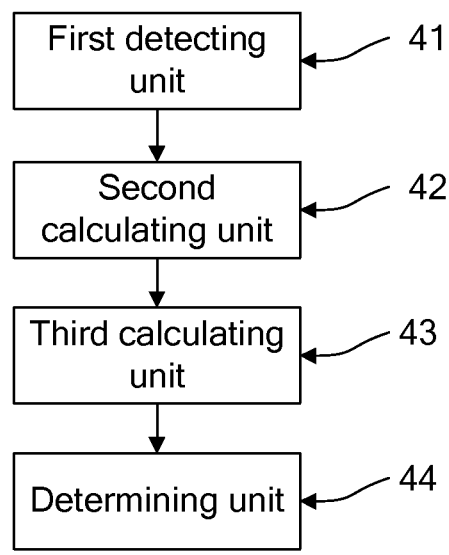
FIG. 4 is a block diagram of a base station according to an embodiment of the present invention.

An embodiment of the present invention provides a base station. As shown in FIG. 4, the base station includes: a first detecting unit 41, a second calculating unit 42, a third calculating unit 43, and a determining unit 44.

The first detecting unit 41 is configured to detect a dedicated preamble sequence adopted by a random access procedure executed with a user equipment on a target uplink component carrier. The second calculating unit 42 is configured to calculate a timing advance value of the target uplink component carrier according to the dedicated preamble sequence. The third calculating unit 43 is configured to calculate a difference between the timing advance value of the target uplink component carrier and a timing advance value of a predetermined uplink component carrier. The determining unit 44 is configured to determine that, a target uplink component carrier with a difference greater than a second predetermined threshold cannot share a timing advance value with the predetermined uplink component carrier, and a target uplink component carrier with a difference not greater than the second predetermined threshold can share a timing advance value with the predetermined uplink component carrier.

The base station provided in this embodiment together with a user equipment may form a system for detecting sharing of a timing advance value. In the system, detecting whether the uplink component carriers can share the same TA value is mainly completed by the base station.

According to the method, user equipment, base station, and system for detecting sharing of a timing advance value provided in the embodiments of the present invention, the user equipment or base station judges whether the user equipment having multiple uplink component carriers can share a TA value, so that the base station performs corresponding processing. Specifically speaking, the user equipment may determine, through a time offset between synchronization of downlink component carriers corresponding to uplink component carriers, that a too large time offset indicates that the same TA value cannot be shared; the base station may calculate a TA value directly through a dedicated preamble sequence, and then compares the TA value with a TA value of one of the component carriers, where a too large difference between the TA values indicates that the same TA value cannot be shared.

According to the embodiments of the present invention, the base station or the user equipment can distinguish which uplink CCs may share the TA value, so that the base station deletes configuration of the uplink CC incapable of sharing the TA value. In this way, the base station can normally provide a carrier aggregation service for the UE. In a normal case, the base station provides the carrier aggregation service for uplink CCs capable of sharing the TA value.

In order to introduce the solutions of the present invention more clearly, the technical solutions in the embodiments of the present invention are clearly and completely described in the following with reference to the accompanying drawings in the embodiments of the present invention. Obviously, the described embodiments are merely part of rather than all of the embodiments of the present invention. All other embodiments obtained by persons of ordinary skill in the art based on the embodiments of the present invention without making creative efforts shall fall within the protection scope of the present invention.

Embodiment 1

Figure 5:
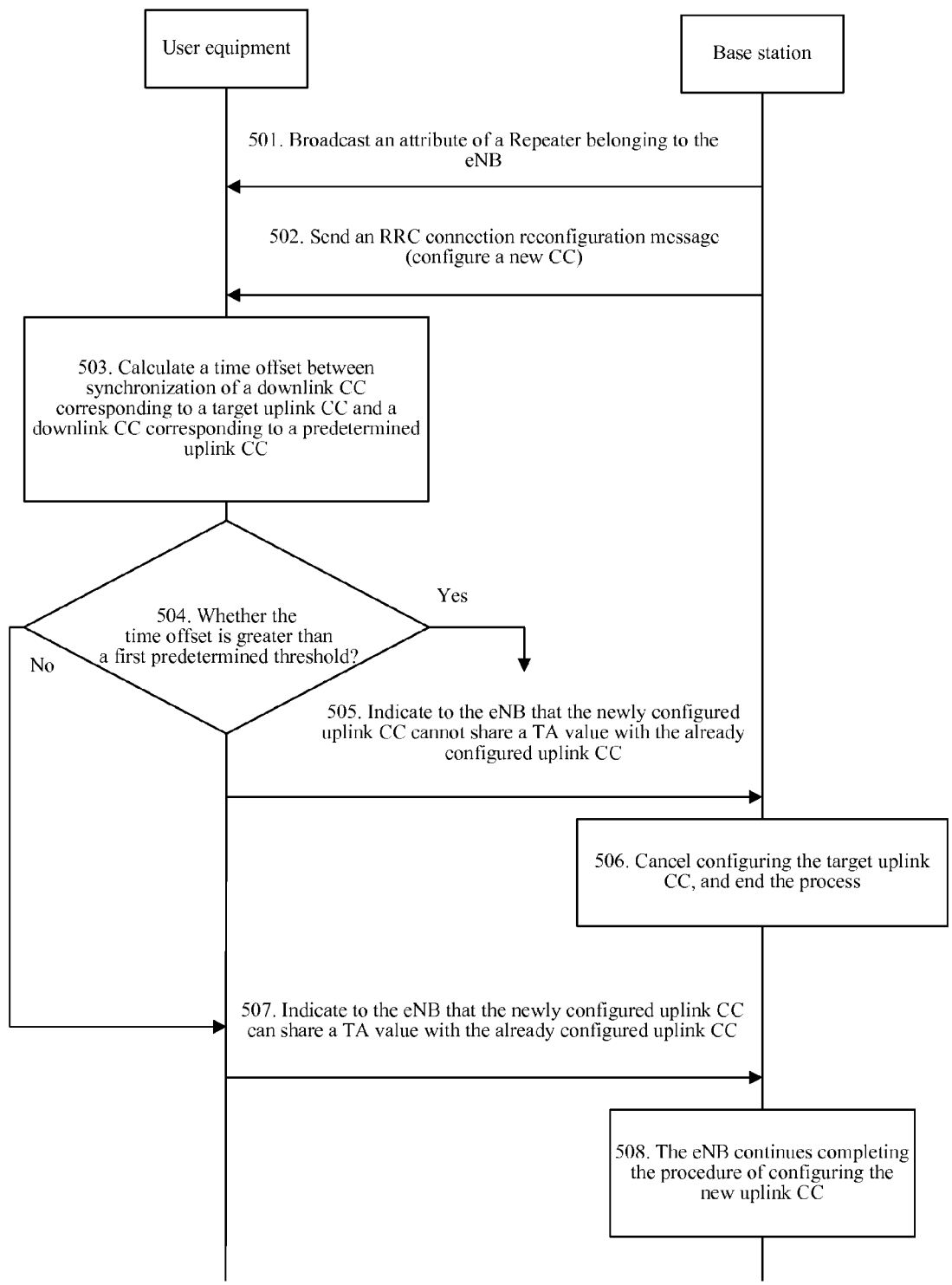
FIG. 5 is a flow chart of a method for detecting sharing of a timing advance value according to Embodiment 1 of the present invention.

This embodiment of the present invention provides a method for detecting sharing of a timing advance value. In a case that an uplink CC is newly configured, in the method, a UE judges whether the newly configured uplink CC can share a TA value with an already configured uplink CC. Specifically, as shown in FIG. 5, the method specifically includes:

501: An eNB broadcasts attributes of all of or part of Repeaters belonging to the eNB to a UE through a system message, where the attribute specifically includes a frequency band that a Repeater belongs to and a working manner of the Repeater, for example, only amplifying an uplink signal or simultaneously amplifying an uplink signal and a downlink signal. Definitely, this step is an optional step, and in most cases, the attribute of the Repeater may not need to be broadcast.

502: When the eNB prepares to newly configure one or multiple uplink CCs for the UE, the eNB sends an RRC (radio control resource) connection reconfiguration (Connection Reconfiguraiton) message to the UE, and may carry resource information of each uplink CC in the RRC connection reconfiguration message in a list manner, so that the UE can obtain relevant resource information of the uplink CC.

503: After receiving the RRC connection reconfiguration message of the eNB, the UE calculates a time offset between synchronization of a downlink component carrier corresponding to a target uplink component carrier and a downlink component carrier corresponding to a predetermined uplink component carrier, where the target uplink CC is the uplink CC that the eNB prepares to newly configure, and the predetermined uplink CC is an already configured uplink CC in the UE.

When a downlink CC corresponding to an uplink CC is searched for, the downlink CC corresponding to the uplink CC may be searched for through correspondence that is broadcast in the system message, and the downlink CC corresponding to the uplink CC may also be searched for through correspondence belonging to a same band (Band), that is, the downlink CC belonging to the same Band as the uplink CC belongs to is searched for.

Optionally, if the eNB broadcasts the attribute of the Repeater in the system message in the step 501, a newly configured uplink CC without a configured Repeater or with a configured Repeater that is a Repeater simultaneously amplifying the uplink signal and downlink signal may be selected as the target uplink CC.

Generally speaking, an uplink PCC (Primary Component Carrier, Primary Component Carrier) in already configured uplink CCs may be selected as the predetermined uplink CC in this embodiment.

In a practical application, the UE in this embodiment may select to report a calculation result to the eNB through an RRC connection reconfiguration complete (RRC Connection Reconfiguration Complete) message.

504: The UE judges whether the time offset is greater than a first predetermined threshold; if the time offset is greater than the first predetermined threshold, execute 505; if the time offset is not greater than the first predetermined threshold, execute 507.

Through the foregoing procedure of calculating the time offset and judging whether the time offset is greater than the first predetermined threshold, it may be obtained whether the newly configured uplink CC may share a same TA value with the already configured uplink CC. Reference may be made to the subsequent procedure for a specific analysis.

Optionally, if the UE report the calculation result to the eNB through the RRC connection reconfiguration complete (RRC Connection Reconfiguration Complete) message in the step 503, the judging procedure is executed by the eNB, that is, if the time offset is greater than the first predetermined threshold, the eNB may skip the procedure of 505 and directly execute the procedure of 506; and if the time offset is not greater than the first predetermined threshold, the eNB may skip the procedure of 507 and directly execute the procedure of 508.

505: Because the time offset is greater than the first predetermined threshold, which indicates that a time difference between synchronization of the two uplink CCs is large, the newly configured uplink CC and the already configured uplink CC cannot share the same TA value. In this embodiment, indication information needs to be sent to the eNB, so as to indicate to the eNB that the newly configured uplink CC and the already configured uplink CC cannot share the TA value.

Generally speaking, the indication information sent by the UE may be an RRC connection reconfiguration complete (RRC Connection Reconfiguration Complete) message, where the message may indicate, through an IE (Information Element, information element), to the eNB that the newly configured uplink CC and the already configured uplink CC cannot share the TA value.

506: The newly configured uplink CC cannot share the TA value with the already configured uplink CC, and therefore, in order to enable the eNB to continue providing a normal service for the UE, the eNB in this embodiment needs to cancel configuring the target uplink CC, and then ends the process.

507: Because the time offset is not greater than the first predetermined threshold, which indicates that a time difference between synchronization of the two uplink CCs is small, the newly configured uplink CC and the already configured uplink CC can share the same TA value. In this embodiment, indication information needs to be sent to the eNB, so as to indicate to the eNB that the newly configured uplink CC and the already configured uplink CC can share the TA value.

Generally speaking, the indication information sent by the UE may be an RRC connection reconfiguration complete message, where the message may indicate, through an IE, to the eNB that the newly configured uplink CC and the already configured uplink CC can share the TA value.

508: The newly configured uplink CC can share the TA value with the already configured uplink CC, therefore, the eNB may continue completing the procedure of configuring the new uplink CC, and the eNB records the newly configured uplink CC which is successfully configured and has the time offset not greater than the first predetermined threshold.

During implementation of this embodiment, the eNB may also instruct, in the RRC connection reconfiguration message, the UE to newly configure multiple uplink CCs simultaneously, and then the UE needs to calculate time offsets for the newly configured uplink CCs, and performs comparison to judge which newly configured uplink CCs may share the TA value with the already configured uplink CC, and which newly configured uplink CCs cannot share the TA value with the already configured uplink CC. At this time, the UE may indicate, in the RRC connection reconfiguration complete message in a list-like manner, to the eNB whether each newly configured uplink CC may share the TA value with the already configured CC. Correspondingly, according to the indication of the UE, the eNB needs to continue completing configuration of the uplink CC capable of sharing the TA value, and cancel configuration of the uplink CC incapable of sharing the TA value.

According to the method for detecting sharing of a timing advance value provided in the embodiment of the present invention, the user equipment judges whether multiple uplink component carriers can share a TA value, so that the base station performs corresponding processing, so as to enable the eNB to provide a normal service for the UE. Specifically speaking, the user equipment may determine, through the time offset between the synchronization of downlink component carriers corresponding to the uplink component carriers, that a too large time offset indicates that the same TA value cannot be shared.

Embodiment 2

Figure 6:
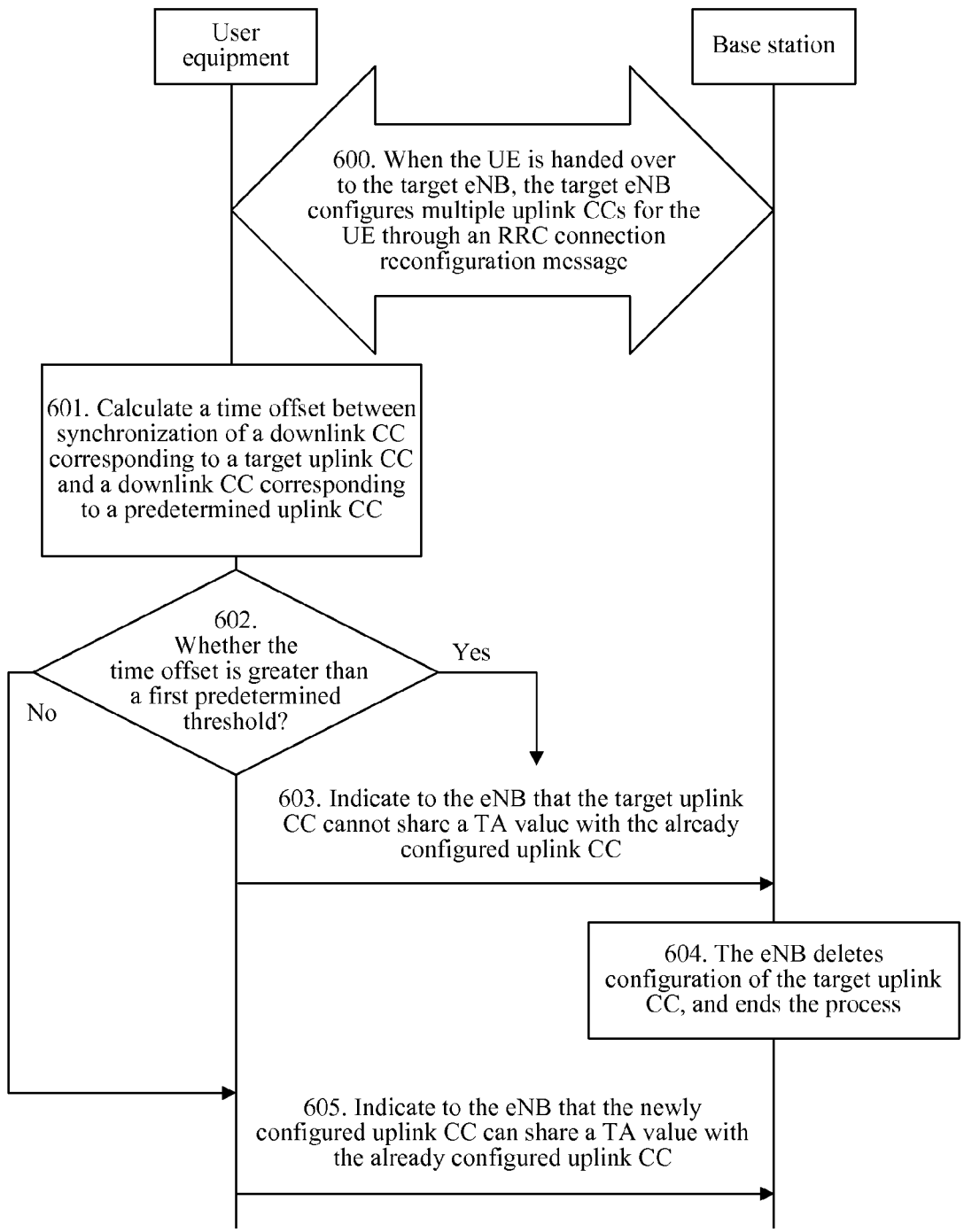
FIG. 6 is a flow chart of a method for detecting sharing of a timing advance value according to Embodiment 2 of the present invention.

This embodiment of the present invention provides a method for detecting sharing of a timing advance value. In a case that an eNB configures multiple uplink CCs for a UE, according to the method, the UE judges whether the multiple uplink CCs can share a TA value. Specifically, as shown in FIG. 6, the method specifically includes:

601: When a UE is in a connection state, if an eNB configures at least two uplink CCs for the UE, calculate a time offset between synchronization of a downlink CC corresponding to a target uplink CC and a downlink CC corresponding to a predetermined uplink CC.

In this embodiment, the UE selects one predetermined uplink CC from already configured uplink CCs and regards the downlink CC corresponding to the predetermined uplink CC as a reference downlink CC, and then calculates a time offset between a downlink CC corresponding to another already configured uplink CC (used as the target uplink CC) and the reference downlink CC. Generally speaking, in this embodiment, an uplink PCC may be selected as the predetermined uplink CC.

When the downlink CC corresponding to the uplink CC is searched for, the downlink CC corresponding to the uplink CC may be searched for through correspondence that is broadcast in a system message, and the downlink CC corresponding to the uplink CC may also be searched for through correspondence belonging to a same band (Band), that is, the downlink CC belonging to the same Band as the uplink CC belongs to is searched for.

Optionally, in this embodiment, according to the manner of the procedure of 501 in Embodiment 1, the eNB may also broadcast an attribute of a Repeater in the system message. In this case, an uplink CC without a configured Repeater or with a configured Repeater that is a Repeater simultaneously amplifying an uplink signal and a downlink signal may be selected as the target uplink CC of this embodiment.

602: The UE judges whether the time offset is greater than a first predetermined threshold; if the time offset is greater than the first predetermined threshold, execute 603; if the time offset is not greater than the first predetermined threshold, execute 605.

Through the foregoing procedure of calculating the time offset and judging whether the time offset is greater than the first predetermined threshold, it may be obtained whether a newly configured uplink CC may share a same TA value with the already configured uplink CC. Reference may be made to the subsequent procedure for a specific analysis.

603: Because the time offset is greater than the first predetermined threshold, which indicates that a time difference between synchronization of the target uplink CC and the predetermined uplink CC is large, the target uplink CC and the predetermined uplink CC cannot share the same TA value. In this embodiment, indication information needs to be sent to the eNB, so as to indicate to the eNB that the target uplink CC and the predetermined uplink CC cannot share the TA value.

Generally speaking, the indication information sent by the UE may be an RRC message, may also be an MAC (Media Access Control, Media Access Control) message, that is, an MAC CE (Control Element, control unit), and may also be a contention-based random access procedure initiated on the asynchronous uplink CC by the UE.

Specifically, in the RRC message or the MAC CE or an MSG3 (Message3, message3) in the random access procedure, the UE may indicate to the eNB that the uplink CC cannot share the TA value with the predetermined uplink CC, or report the time offset between the synchronization of the corresponding downlink CC and the reference downlink CC.

604: The target uplink CC cannot share the TA value with the predetermined uplink CC, and therefore, in order to enable the eNB to continue providing a normal service for the UE, the eNB in this embodiment needs to delete configuration of the target uplink CC, that is, execute a CC deconfiguration operation.

Definitely, if the eNB receives the RRC message or the MAC CE, this procedure may also select not to delete the configuration of the target uplink CC, instead, the eNB triggers the UE to initiate a non-contention random access procedure on the uplink CC incapable of sharing the TA value, so as to judge whether the uplink CC can share the same TA value with another already configured uplink CC.

If the eNB receives the contention random access procedure, the eNB calculates and records a TA value that needs to be adjusted in a preamble sequence in the random access procedure, and confirms, through the MSG3 message, the UE and the CC incapable of sharing the TA value. It is judged, by comparing the TA value to be adjusted with a TA value of a certain uplink CC in the recorded already configured CC during random access, whether the CC needs to be deconfigured. Specifically, the certain uplink CC in the already configured CC may be the uplink PCC of the UE.

605: Because the time offset is not greater than the first predetermined threshold, which indicates that a time difference between synchronization of the uplink CCs is small, the target uplink CC and the predetermined uplink CC can share the same TA value.

During specific implementation, in this embodiment, in a case that cell handover occurs, the UE may select to send indication information to the eNB, so as to indicate to the eNB that the target uplink CC and the predetermined uplink CC can share the TA value. Definitely, if the cell handover does not occur in this procedure, the foregoing indication information may not be sent to the eNB.

Generally speaking, the indication information sent by the UE may be an RRC message, may also be an MAC (Media Access Control, media access control) message, that is, an MAC CE, and may also be a contention-based random access procedure initiated on the asynchronous uplink CC by the UE.

Specifically, in the RRC message or the MAC CE or an MSG3 (Message3, message3) in the random access procedure, the UE may indicate to the eNB that the uplink CC can share the TA value, or report the time offset of the synchronization of the corresponding downlink CC.

During the specific implementation, the UE may report multiple uplink CCs incapable of sharing the TA value to the eNB simultaneously in a list manner.

According to the method for detecting sharing of a timing advance value provided in the embodiment of the present invention, the user equipment judges whether multiple uplink component carriers can share a TA value, so that the base station performs corresponding processing, so as to enable the eNB to provide a normal service for the UE. Specifically speaking, the user equipment may determine, through the time offset between synchronization of the downlink component carrier corresponding to the uplink component carrier, that a too large time offset indicates that the same TA value cannot be shared.

This embodiment mainly describes the procedure that the UE in the connection state judges whether the already configured uplink CC can share the TA value and performs processing. In a practical application, the UE generally has strong mobility, so that the already configured uplink CC may be an uplink CC after the cell handover. As shown by a dashed box in FIG. 6, the embodiment of the present invention may further include the following step before the step 601.

600: When a serving eNB decides to hand over a UE to a target eNB, the target eNB configures multiple uplink CCs for the UE through a mobility ControlInfo IE in an RRC connection reconfiguration message, and allocates a designated uplink CC for the UE to complete a handover procedure. Specifically, the designated uplink CC may be an uplink PCC of the UE.

Embodiment 3

Figure 7:
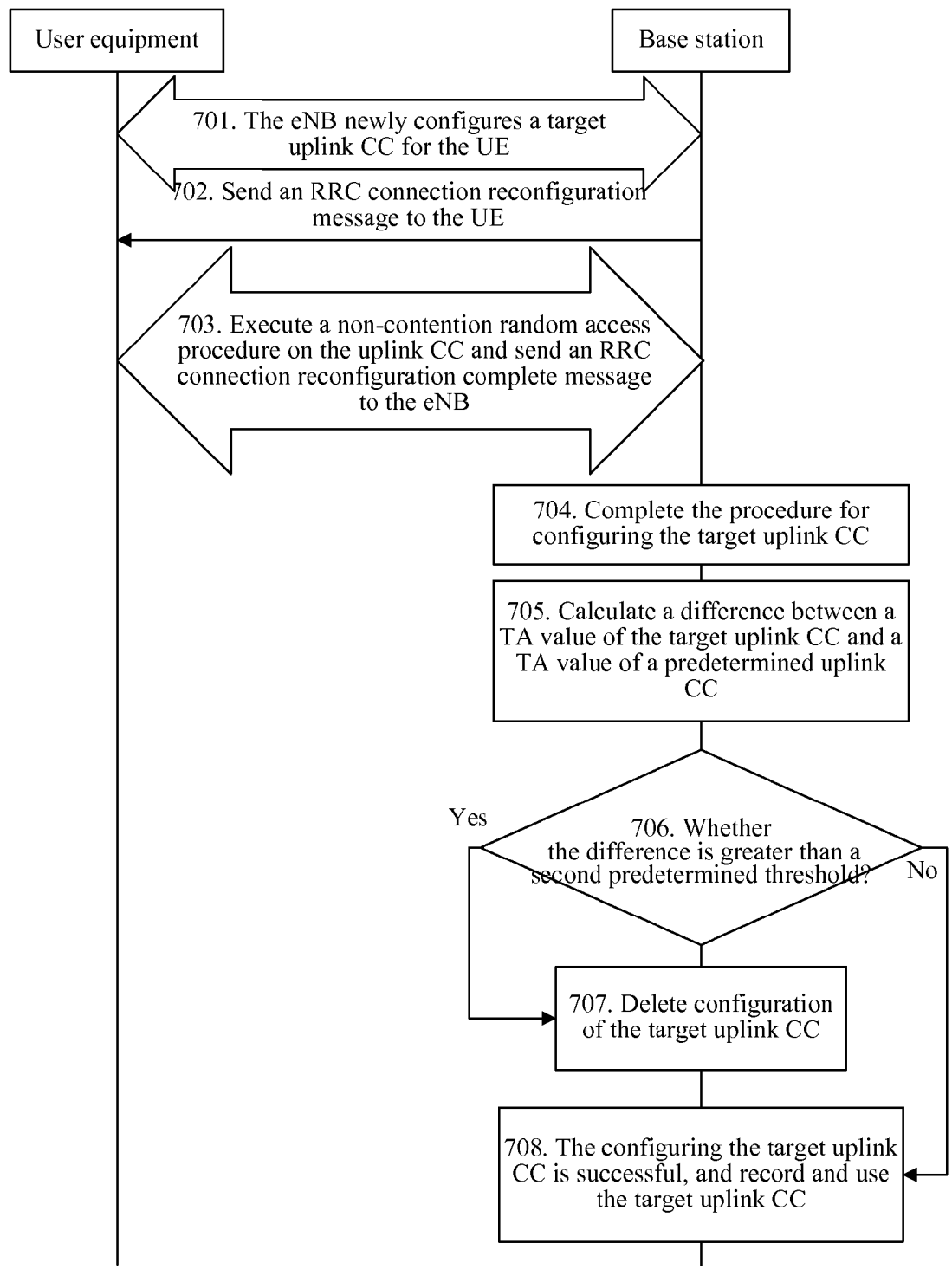
FIG. 7 is a flow chart of a method for detecting sharing of a timing advance value according to Embodiment 3 of the present invention.

This embodiment of the present invention provides a method for detecting sharing of a timing advance value. In a case that uplink CCs are newly configured, in the method, an eNB judges whether the multiple uplink CCs can share a TA value. Specifically, as shown in FIG. 7, the method specifically includes:

701: An eNB newly configures target uplink CCs for a UE, so that the UE can perform service transmission through the newly configured target uplink CCs.

702: The eNB sends an RRC connection reconfiguration message to the UE, and may select to carry resource information of all the newly configured target uplink CCs in the RRC connection reconfiguration message in a list manner, where the resource information may include a resource and Preamble (preamble sequence) used when instructing the UE to perform non-contention random access on the target uplink CCs.

Specifically, a resource information source of an uplink CC has, but is not limited to, the following situations.

First, if in a system message of a cell (cell) that the target uplink CC belongs to, public random access resources (including frequency and time slot resources) are configured for the target uplink CC, the eNB only needs to configure a public random access resource on the target uplink CC for the UE and allocate a dedicated time slot resource and a dedicated Preamble on the target uplink CC for the UE.

Second, if in a system message of a cell (cell) that the target uplink CC belongs to, no public random access resource (including frequency and time slot resources) is configured for the target uplink CC, the eNB needs to allocate a dedicated time slot resource and a dedicated Preamble on the target uplink CC for the UE, and also needs to temporarily allocate a time domain or frequency resource on the target uplink CC for the UE for a non-contention random access procedure.

Third, if in a system message of a cell (cell) that the target uplink CC belongs to, no public random access resource (including frequency and time slot resources) is configured for the target uplink CC, but public random access resources (including frequency and time slot resources), that is, random access resources that are broadcast through the system message of the cell that the target uplink CC belongs to, are configured for another uplink CC belonging to a same Band as the target uplink CC belongs to, the eNB may indicate the random access resources of the another uplink CC belonging to the same Band to the UE, and allocate a dedicated time slot resource and a dedicated Preamble on the target uplink CC for the UE.

Optionally, in the foregoing several situations, the dedicated Preamble may also be a special value, for instructing the UE to randomly select a Preamble.

Preferably, the random access resource needs to be carried in the RRC connection reconfiguration message, and the dedicated time slot recourse and the dedicated Preamble may be carried in the RRC connection reconfiguration message, and may also be carried through a physical layer message PDCCH order or an MAC (Media Access Control, media access control) message, which is equivalent to being carried through an added MAC CE (Media Access Control Control Element, media access control control unit). If the dedicated time slot recourse and the dedicated Preamble are carried in the PDCCH order or the MAC CE, a sequence number for a CC needs to be added in the physical layer message or the MAC message, where the sequence number needs to correspond to a CC sequence number added in the RRC connection reconfiguration message to indicate a CC. The PDCCH order or the MAC CE must be sent after the RRC configuration message is sent.

703: After receiving the RRC connection reconfiguration message sent by the eNB, the UE executes a non-contention random access procedure on each uplink CC in the RRC connection reconfiguration message and sends an RRC connection reconfiguration complete message to the eNB. For the foregoing different situations of the resource information source of the target uplink CC, in this procedure, the executing the random access procedure has the following situations.

First, if the target uplink CC is configured with the public random access resource, the UE executes the non-contention random access procedure by using the dedicated time slot resource and the dedicated Preamble which are allocated by the eNB on the public random access resource.

Second, if the target uplink CC is not configured with the public random access resource, but the eNB allocates a dedicated random access resource to the UE, the UE executes the non-contention random access procedure by using the dedicated time slot resource and the dedicated Preamble which are allocated by the eNB on the dedicated random access resource.

Third, if the eNB allocates the public random access resource and the dedicated time slot resource and the dedicated Preamble to an adjacent uplink CC in the same Band, the UE executes the non-contention random access procedure by using the dedicated time slot resource and the dedicated Preamble on the designated uplink CC.

Optionally, if the dedicated Preamble allocated by the eNB to the UE in the step 702 is a special value, the UE randomly selects a Preamble and executes the random access procedure in a designated time slot.

704: After receiving the radio control resource connection reconfiguration complete message sent by the UE, the eNB completes the procedure for configuring the target uplink CC.

705: The eNB detects, in a designated time slot, the dedicated Preamble sent by the UE, calculates a TA value of the target uplink CC according to the dedicated Preamble, and calculates a difference between the TA value of the target uplink CC and a TA value of a predetermined uplink CC, where the predetermined uplink CC refers to an already configured uplink CC in the UE, for example, an uplink PCC of the UE.

Optionally, if the UE randomly selects a Preamble to perform the random access procedure in the step 703, the eNB needs to confirm the UE through an MSG3 message.

706: Judge whether the difference is greater than a second predetermined threshold; if the difference is greater than the second predetermined threshold, execute 707; and if the difference is not greater than the second predetermined threshold, execute 708.

707: Because the difference is greater than the second predetermined threshold, which indicates that the difference between the TA value of the target uplink CC and the TA value of the already configured uplink CC is large, the target uplink CC cannot share a TA value with the already configured uplink CC. In order to enable the eNB to provide a normal service for the UE, in this embodiment, the eNB deletes configuration of the target uplink CC and sends an RRC connection reconfiguration message to instruct the UE to deconfigure the uplink CC, that is, remove the CC.

708: Because the difference is not greater than the second predetermined threshold, which indicates that the TA value of the target uplink CC is close to the TA value of the already configured uplink CC, that is, the target uplink CC may share a TA value with the already configured uplink CC, the eNB considers that the procedure of configuring the target uplink CC is successful, and records and starts to use the target uplink CC.

In this embodiment, if the eNB detects that multiple uplink CCs simultaneously configured all cannot share the TA value with the already configured uplink CC, the eNB may simultaneously instruct the UE to deconfigure the multiple uplink CCs in a list manner.

According to the method for detecting sharing of a timing advance value provided in the embodiment of the present invention, the base station judges whether the user equipment having multiple uplink component carriers can share a TA value, so that the base station performs corresponding processing, for example, deleting configuration of an uplink component carrier incapable of sharing the TA value, or not allowing an uplink component carrier incapable of sharing the TA value to be configured. Specifically speaking, the base station may directly calculate a TA value through the dedicated preamble sequence, and compare the TA value with a TA value of one of the component carriers, where a too large difference between the TA values indicates that the same TA value cannot be shared.

According to the method for detecting sharing of a timing advance value provided in the embodiment of the present invention, the base station judges whether multiple uplink component carriers can share a TA value, so that the base station performs corresponding processing, so as to enable the eNB to provide a normal service for the UE.

Embodiment 4

Figure 8:
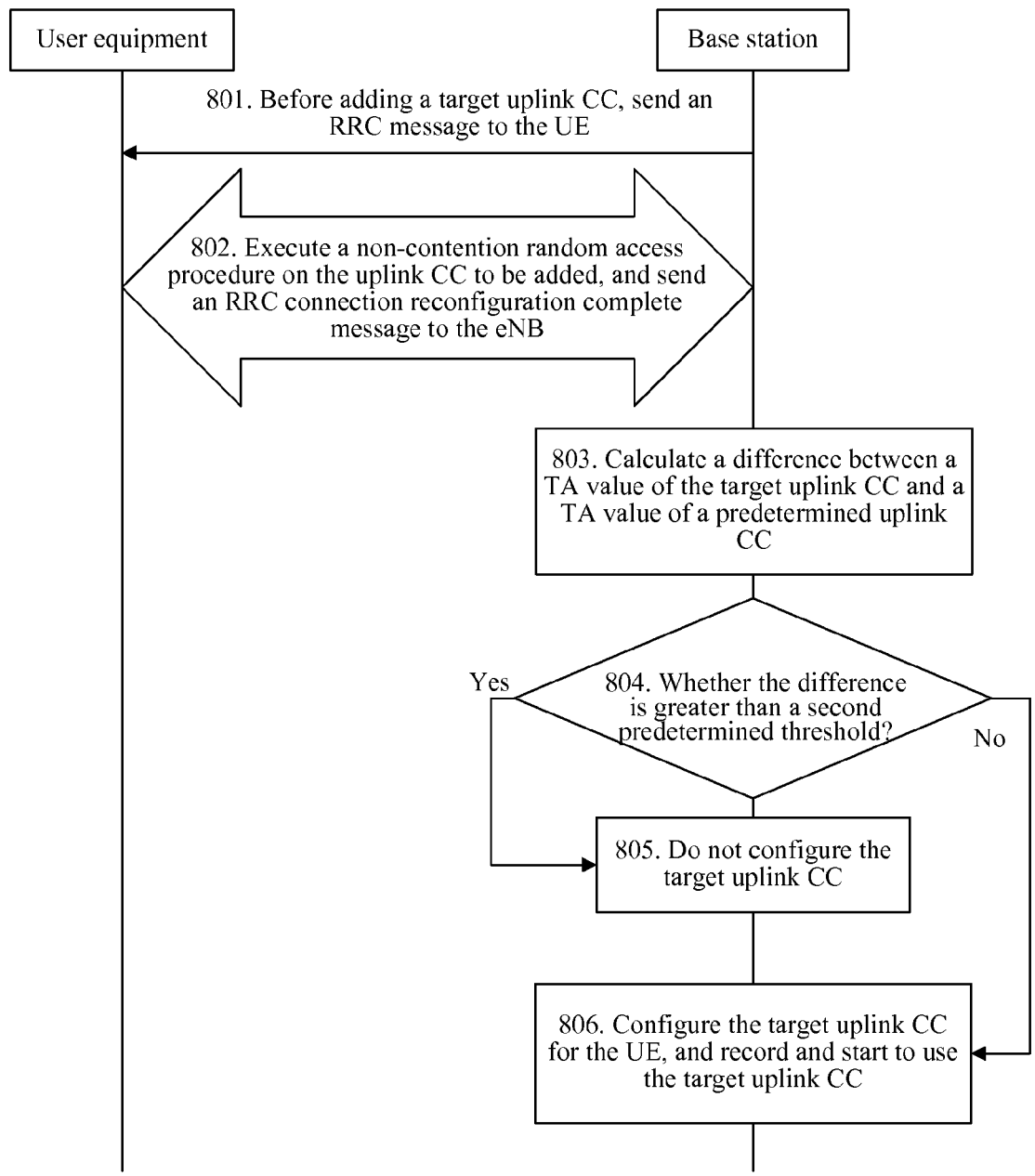
FIG. 8 is a flow chart of a method for detecting sharing of a timing advance value according to Embodiment 4 of the present invention.

This embodiment of the present invention provides a method for detecting sharing of a timing advance value. In a case that uplink CCs are newly configured, according to the method, an eNB judges whether the multiple uplink CCs can share a TA value. Specifically, as shown in FIG. 8, the method specifically includes:

801: If an eNB needs to add one or multiple target uplink CCs for a UE, before adding the target uplink CC, the eNB sends an RRC message to the UE, where the RRC message may be an RRC connection reconfiguration (RRC Connection Reconfiguraiton) message, and the RRC message includes resource information of the target uplink CC, that is, the eNB sends the resource information of the uplink CC that the eNB intends to newly add for the UE to the UE through the RRC message, where the resource information may include a resource and Preamble used when the UE is instructed to perform non-contention random access on it. Reference may be made to the procedure 702 in Embodiment 3 for a specific resource information source of the uplink CC.

802: After receiving the RRC connection reconfiguration message sent by the eNB, the UE executes a non-contention random access procedure on each to-be-added uplink CC in the RRC connection reconfiguration message and, optionally, sends an RRC connection reconfiguration complete message to the eNB. Reference may be made to the step 703 in Embodiment 3 for the executing the random access procedure in this procedure.

803: The eNB detects, in a designated time slot, a dedicated Preamble sent by the UE, calculates a TA value of the target uplink CC according to the dedicated Preamble, and calculates a difference between the TA value of the target uplink CC and a TA value of a predetermined uplink CC, where the predetermined uplink CC refers to an already configured uplink CC in the UE, for example, an uplink PCC of the UE.

Optionally, if the UE randomly selects a Preamble to perform the random access procedure, the eNB needs to confirm the UE through an MSG3 message.

804: Judge whether the difference is greater than a second predetermined threshold; if the difference is greater than the second predetermined threshold, execute 805; and if the difference is not greater than the second predetermined threshold, execute 806.

805: Because the difference is greater than the second predetermined threshold, which indicates that the difference between the TA value of the target uplink CC and the TA value of the already configured uplink CC is large, the target uplink CC cannot share a TA value with the already configured uplink CC. In order to enable the eNB to provide a normal service for the UE, in this embodiment, the eNB does not configure the target uplink CC.

806: Because the difference is not greater than the second predetermined threshold, which indicates that the TA value of the target uplink CC is close to the TA value of the already configured uplink CC, that is, the target uplink CC may share a TA value with the already configured uplink CC, the eNB configures the target uplink CC for the UE through a CC configuration procedure, and records and starts to use the target uplink CC.

In this embodiment, if the eNB detects that multiple uplink CCs simultaneously configured all can share the TA value with the already configured uplink CC, the new uplink CCs may be simultaneously configured for the UE through the CC configuration procedure simultaneously.

According to the method for detecting sharing of a timing advance value provided in the embodiment of the present invention, the base station judges whether the user equipment having multiple uplink component carriers can share a TA value, so that the base station performs corresponding processing, for example, deleting configuration of an uplink component carrier incapable of sharing the TA value, or not allowing an uplink component carrier incapable of sharing the TA value to be configured. Specifically speaking, the base station may directly calculate a TA value through a dedicated preamble sequence, and compare the TA value with a TA value of one of the component carriers, where a too large difference between the TA values indicates that the same TA value cannot be shared.

According to the method for detecting sharing of a timing advance value provided in the embodiment of the present invention, the base station judges whether multiple uplink component carriers can share a TA value, so that the base station performs corresponding processing, so as to enable the eNB to provide a normal service for the UE.

Embodiment 5

Figure 9:
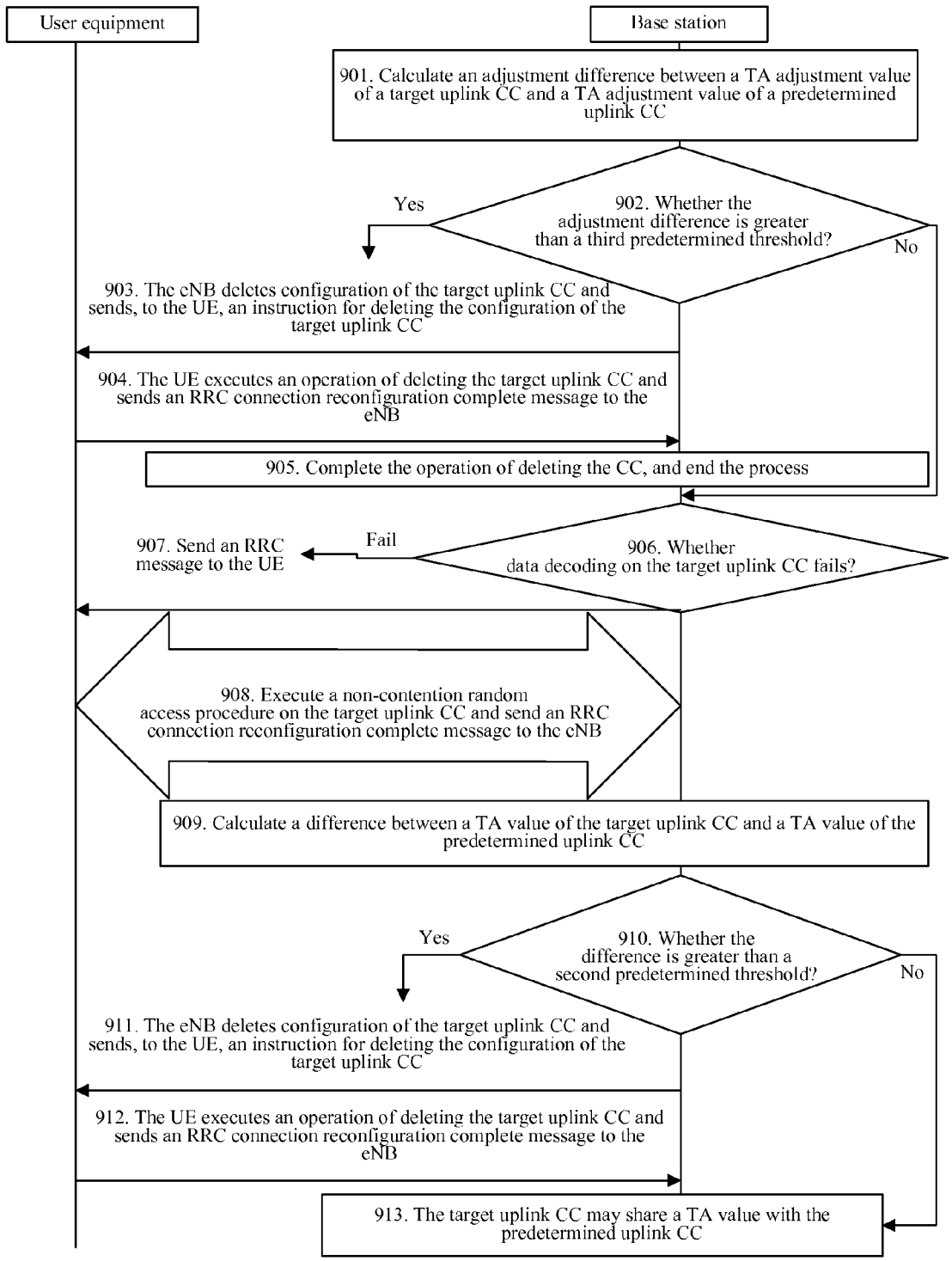
FIG. 9 is a flow chart of a method for detecting sharing of a timing advance value according to Embodiment 5 of the present invention.

This embodiment of the present invention provides a method for detecting sharing of a timing advance value. In a case that an eNB already configures multiple uplink CCs for a UE, according to the method, the eNB judges whether the multiple uplink CCs can share a TA value. Specifically, as shown in FIG. 9, the method specifically includes:

901: When a UE is in a connection state, if an eNB configures at least two uplink CCs for the UE, in this embodiment, at least one uplink CC is selected from the already configured uplink CCs as a predetermined uplink CC, generally, a PCC may be selected as the predetermined uplink CC, and other already configured uplink CCs may all be used as target uplink CCs.

In this embodiment, a timing advance adjustment value of a target uplink component carrier first needs to be detected, and the eNB compares the TA adjustment value of the target uplink CC with a TA adjustment value of the predetermined uplink CC, which specifically is: calculating an adjustment difference between the TA adjustment value of the target uplink CC and the TA adjustment value of the predetermined uplink component carrier.

902: Judge whether the adjustment difference is greater than a third predetermined threshold; if the adjustment difference is greater than the third predetermined threshold, execute 903; and if the adjustment difference is not greater than the third predetermined threshold, execute 906.

903: Because the adjustment difference is greater than the third predetermined threshold, which indicates that the target uplink CC cannot share a timing advance value with the predetermined uplink CC, the eNB deletes corresponding configuration of the target uplink CC and sends, to the UE, an instruction for deleting the configuration of the target uplink CC.

904: After the UE receives the instruction sent by the eNB for deleting the configuration of the target uplink CC, the UE executes an operation of deleting the target uplink CC and sends an RRC connection reconfiguration complete message to the eNB.

905: After receiving the RRC connection reconfiguration complete message sent by the UE, the eNB completes an operation of deconfiguring the CC, and the process ends.

906: Because the adjustment difference is not greater than the third predetermined threshold, which indicates that further detection needs to be performed, in this embodiment, detect data decoding on the target uplink CC; if it is detected that the data decoding on the target uplink CC fails, execute 907; and if it is not detected that the data decoding on the target uplink CC fails, end the process.

907: After it is detected that the data decoding on the target uplink CC fails, the eNB sends an RRC message to the UE, where the RRC message may be an RRC connection reconfiguration (RRC Connection Reconfiguraiton) message, the RRC message includes resource information of the target uplink CC, and the resource information may include a resource and Preamble used when the UE is instructed to perform non-contention random access on it. Reference may be made to the procedure 702 in Embodiment 3 for a specific resource information source of the uplink CC.

908: After receiving the RRC connection reconfiguration message sent by the eNB, the UE executes a non-contention random access procedure on each uplink CC in the RRC connection reconfiguration message and optionally sends an RRC connection reconfiguration complete message to the eNB. Reference may be made to the step 703 in Embodiment 3 for the executing the random access procedure in this procedure.

909: The eNB detects, in a designated time slot, a dedicated Preamble sent by the UE, calculates a TA value of the target uplink CC according to the dedicated Preamble, and calculates a difference between the TA value of the target uplink CC and a TA value of the predetermined uplink CC.

Optionally, if the UE randomly selects a Preamble to perform the random access procedure, the eNB needs to confirm the UE through an MSG3 message.

910: Judge whether the difference is greater than a second predetermined threshold; if the difference is greater than the second predetermined threshold, execute 911; and if the difference is not greater than the second predetermined threshold, execute 913.

911: Because the difference is greater than the second predetermined threshold, which indicates that the difference between the TA value of the target uplink CC and the TA value of the predetermined uplink CC is large, the target uplink CC cannot share a TA value with the predetermined uplink CC. In order to enable the eNB to provide a normal service for the UE, in this embodiment, the eNB deletes configuration of the target uplink CC and sends, to the UE, an instruction for deleting the configuration of the target uplink CC.

912: After the UE receives the instruction sent by the eNB for deleting the configuration of the target uplink CC, the UE executes an operation of deleting the target uplink CC and sends an RRC connection reconfiguration complete message to the eNB.

913: Because the difference is not greater than the second predetermined threshold, which indicates that the TA value of the target uplink CC is close to the TA value of the predetermined uplink CC, the target uplink CC may continue sharing a TA value with the predetermined uplink CC.

It should be noted that, if the eNB detects that multiple uplink CCs simultaneously configured all cannot share the TA value, the eNB may simultaneously instruct the UE to deconfigure the multiple uplink CCs in a list manner.

According to the method for detecting sharing of a timing advance value provided in the embodiment of the present invention, the base station judges whether the user equipment having multiple uplink component carriers can share a TA value, so that the base station performs corresponding processing, for example, deleting configuration of an uplink component carrier incapable of sharing the TA value, or not allowing an uplink component carrier incapable of sharing the TA value to be configured. Specifically speaking, the base station may directly calculate a TA value through a dedicated preamble sequence, and compare the TA value with a TA value of one of the component carriers, where a too large difference between the TA values indicates that the same TA value cannot be shared.

According to the method for detecting sharing of a timing advance value provided in the embodiment of the present invention, the base station judges whether multiple uplink component carriers can share a TA value, so that the base station performs corresponding processing, so as to enable the eNB to provide a normal service for the UE.

Embodiment 6

Figure 10:
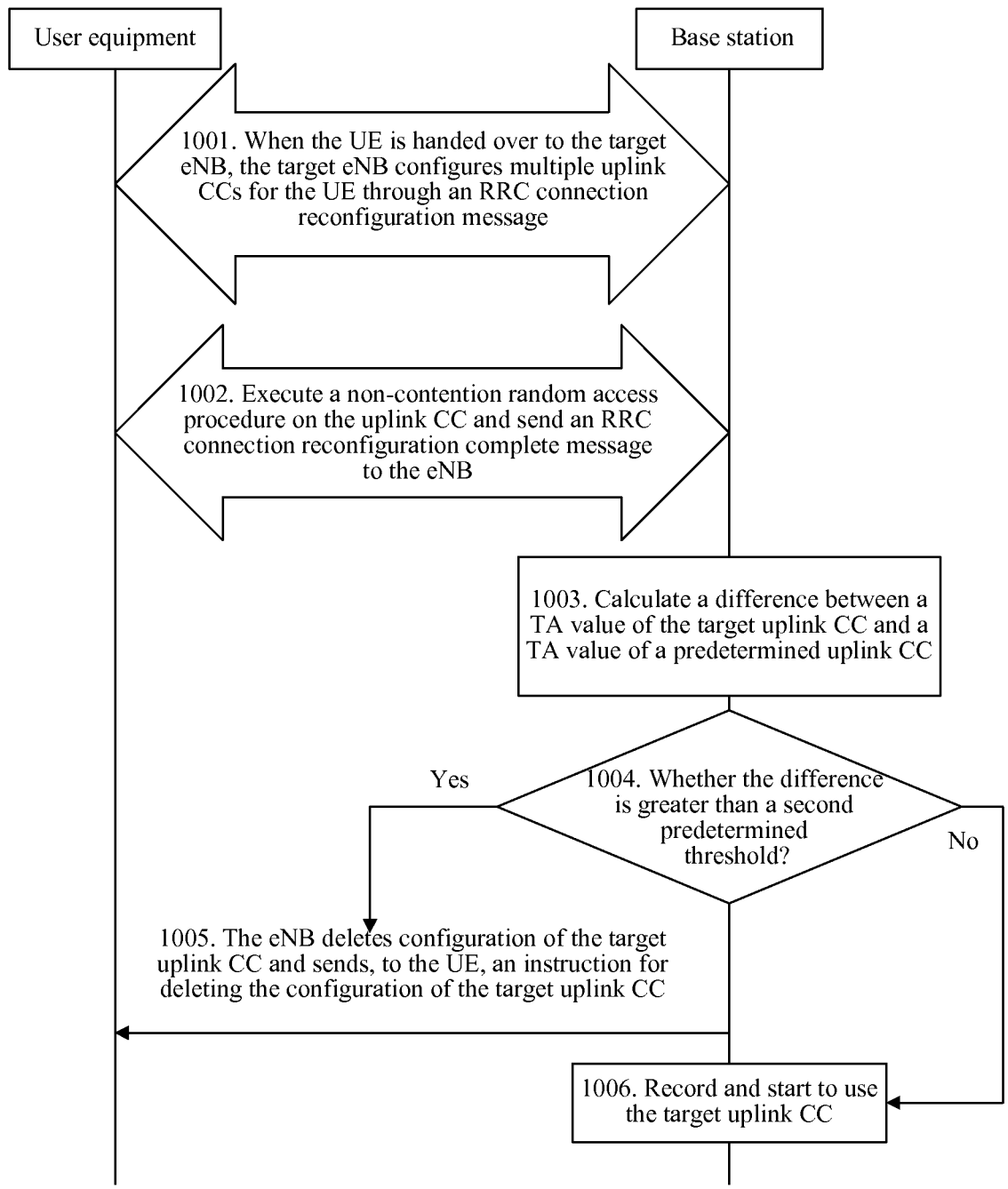
FIG. 10 is a flow chart of a method for detecting sharing of a timing advance value according to Embodiment 6 of the present invention.

This embodiment of the present invention provides a method for detecting sharing of a timing advance value. In the case that an eNB already configures multiple uplink CCs for a UE, according to the method, the eNB judges whether the multiple uplink CCs can share a TA value. Specifically, as shown in FIG. 10, the method specifically includes:

1001: When a serving eNB decides to hand over a UE to a target eNB, the target eNB configures multiple uplink CCs for the UE through a mobility ControlInfo IE in an RRC connection reconfiguration message, and sends resource information of each uplink CC to the UE in a list manner, where the resource information may include a resource and Preamble used when the UE is instructed to perform non-contention random access on it. Reference may be made to the procedure 702 in Embodiment 3 for a specific resource information source of the uplink CC.

Moreover, in this procedure, a predetermined uplink CC is allocated for the UE to complete a handover procedure. Specifically, the predetermined uplink CC may be an uplink PCC of the UE.

1002: After receiving the RRC connection reconfiguration message sent by the eNB, the UE executes a non-contention random access procedure on each uplink CC in the RRC connection reconfiguration message and sends an RRC connection reconfiguration complete message to the eNB. Reference may be made to the step 703 in Embodiment 3 for the executing the random access procedure in this procedure.

1003: after receiving the RRC connection reconfiguration complete message sent by the UE, the eNB completes the handover procedure, and detects, in a designated time slot, a dedicated Preamble sent by the UE through a target uplink CC, calculates a TA value of the target uplink CC according to the dedicated Preamble, and calculates a difference between the TA value of the target uplink CC and a TA value of the predetermined uplink CC.

Optionally, if the UE randomly selects a Preamble to perform the random access procedure, the eNB needs to confirm the UE through an MSG3 message.

1004: Judge whether the difference is greater than a second predetermined threshold; if the difference is greater than the second predetermined threshold, execute 1005; and if the difference is not greater than the second predetermined threshold, execute 1006.

1005: Because the difference is greater than the second predetermined threshold, which indicates that the difference between the TA value of the target uplink CC and the TA value of the predetermined uplink CC is large, the target uplink CC cannot share a TA value with the predetermined uplink CC. In order to enable the eNB to provide a normal service for the UE, in this embodiment, the eNB deletes configuration of the target uplink CC and sends an RRC connection reconfiguration message to instruct the UE to deconfigure the uplink CC, that is, remove the CC.

1006: Because the difference is not greater than the second predetermined threshold, which indicates that the TA value of the target uplink CC is close to the TA value of the predetermined uplink CC, that is, the target uplink CC may share a TA value with the predetermined uplink CC, the eNB considers that the configuration procedure is successful, and records and starts to use the target uplink CC.

In this embodiment, if the eNB detects that multiple uplink CCs simultaneously configured all cannot share the TA value with the predetermined uplink CC, the eNB may simultaneously instruct the UE to deconfigure the multiple uplink CCs in a list manner.

According to the method for detecting sharing of a timing advance value provided in the embodiment of the present invention, the base station judges whether the user equipment having multiple uplink component carriers can share a TA value, so that the base station performs corresponding processing, for example, deleting configuration of an uplink component carrier incapable of sharing the TA value, or not allowing an uplink component carrier incapable of sharing the TA value to be configured. Specifically speaking, the base station may directly calculate a TA value through a dedicated preamble sequence, and compare the TA value with a TA value of one of the component carriers, where a too large difference between the TA values indicates that the same TA value cannot be shared.

According to the method for detecting sharing of a timing advance value provided in the embodiment of the present invention, the base station judges whether multiple uplink component carriers can share a TA value, so that the base station performs corresponding processing, so as to enable the eNB to provide a normal service for the UE.

Embodiment 7

Figure 11:
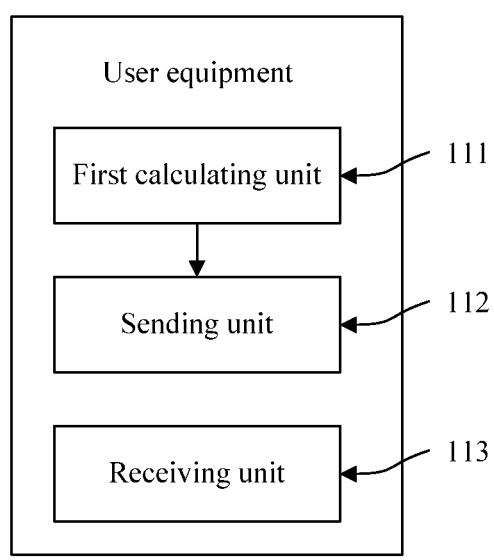
FIG. 11 is a block diagram of a user equipment according to Embodiment 7 of the present invention.

An embodiment of the present invention provides a UE. As shown in FIG. 11, the UE includes a first calculating unit 111 and a sending unit 112.

The first calculating unit 111 is configured to calculate a time offset between synchronization of a downlink component carrier corresponding to a target uplink component carrier and a downlink component carrier corresponding to a predetermined uplink component carrier. The sending unit 112 is configured to send indication information to a base station, so as to indicate that a target uplink component carrier with a time offset greater than a first predetermined threshold cannot share a timing advance value with the predetermined uplink component carrier, and/or a target uplink component carrier with a time offset not greater than the first predetermined threshold can share a timing advance value with the predetermined uplink component carrier.

In this embodiment, the target uplink component carrier may be at least one target uplink component carrier, so as to process multiple target uplink CCs in a batch; the indication information includes information for indicating whether each target uplink component carrier can share the timing advance value with the predetermined uplink component carrier.

In this embodiment, the target uplink CC and the predetermined uplink CC may specifically be that: The target uplink component carrier includes an uplink component carrier which is included in the base station and is newly configured for the user equipment, and the predetermined uplink component carrier includes a currently already configured uplink component carrier of the user equipment. For judgment of TA value sharing of the target uplink CC and the predetermined uplink CC, in this embodiment, the user equipment may further include a receiving unit 113. The receiving unit 113 is configured to receive a radio control resource connection reconfiguration message sent by the base station before the time offset is calculated, where the radio control resource connection reconfiguration message includes resource information of the newly configured uplink component carrier. The base station in this embodiment is configured to, after receiving the indication information, record the uplink component carrier that is successfully configured and is with the time offset not greater than the first predetermined threshold. The base station is further configured to, after receiving the indication information, cancel configuring the uplink component carrier with the time offset greater than the first predetermined threshold.

In another case, the target uplink CC and the predetermined uplink CC in this embodiment may specifically be that: The predetermined uplink component carrier includes one uplink component carrier of already configured uplink component carriers of the user equipment, and the target uplink component carrier includes an uplink component carrier of the already configured uplink component carriers of the user equipment except the one uplink component carrier. Generally speaking, the predetermined uplink CC is mainly a PCC. In this case, the base station is further configured to, after receiving the indication information, delete corresponding configuration of the uplink component carrier with the time offset not greater than the first predetermined threshold.

If the UE is just handed over to a new target base station, the already configured uplink component carrier of the user equipment in this embodiment is: an uplink component carrier configured by the target base station for the user equipment after the user equipment is handed over to the target base station, so that the UE can perform TA value sharing judgment after being handed over to the target base station.

The user equipment provided in this embodiment together with the base station may form a system for detecting sharing of a timing advance value. The base station may configure the uplink CC for the user equipment. The user equipment in the system may complete detecting whether the uplink component carriers can share the same TA value.

According to the method for detecting sharing of a timing advance value provided in the embodiment of the present invention, the user equipment judges whether the user equipment having multiple uplink component carriers can share a TA value, so that the base station performs corresponding processing, so as to enable the eNB to provide a normal service for the UE. Specifically speaking, the user equipment may determine, through the time offset between synchronization of downlink component carriers corresponding to uplink component carriers, that a too large time offset indicates that the same TA value cannot be shared.

Embodiment 8

Figure 12:
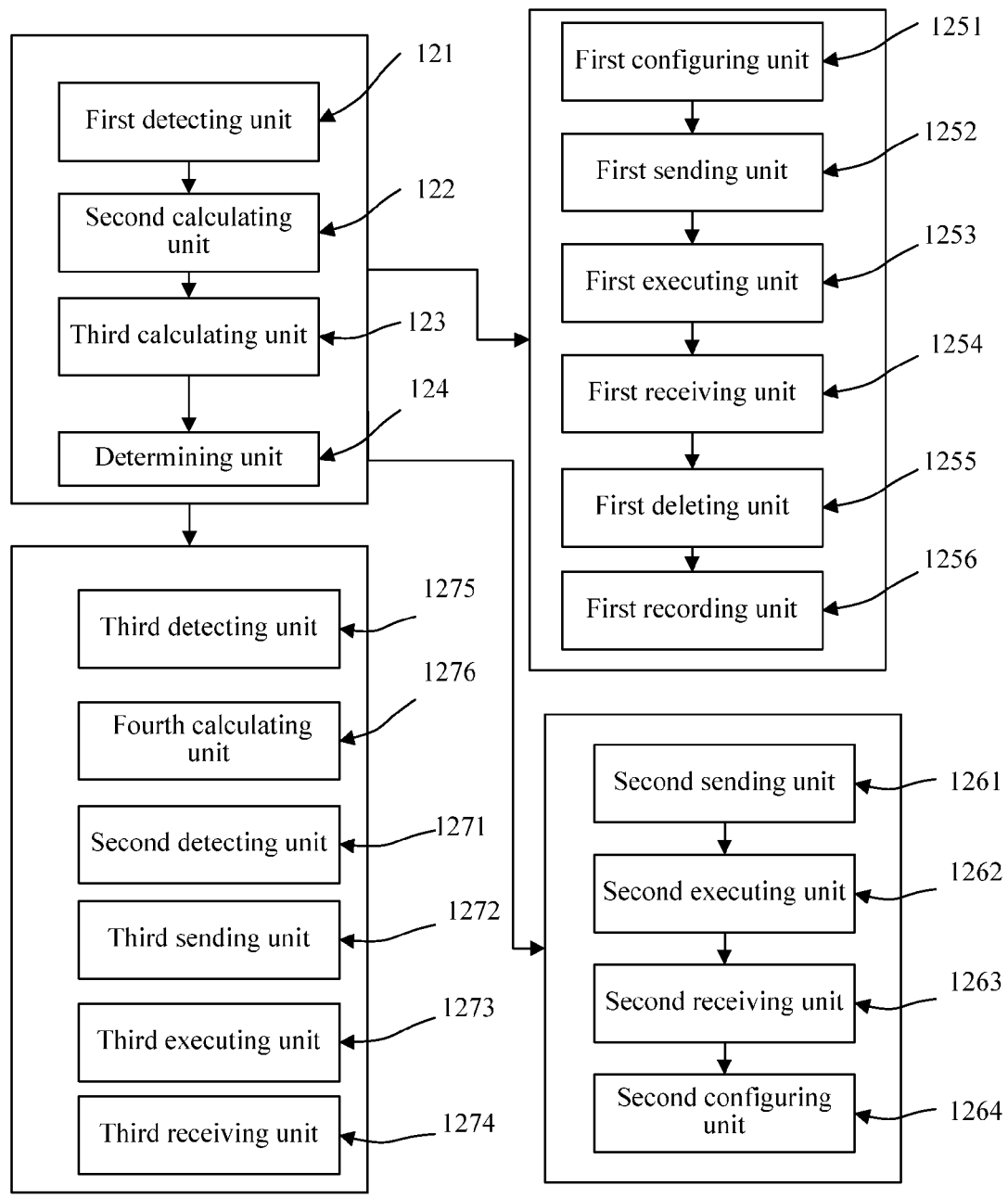
FIG. 12 is a block diagram of a base station according to Embodiment 8 of the present invention.

This embodiment of the present invention provides a base station. A predetermined uplink CC in this embodiment may be a PCC. As shown in FIG. 12, the base station of the embodiment of the present invention includes: a first detecting unit 121, a second calculating unit 122, a third calculating unit 123, and a determining unit 124.

The first detecting unit 121 is configured to detect a dedicated preamble sequence adopted by a random access procedure executed with a user equipment on a target uplink component carrier. The second calculating unit 122 is configured to calculate a timing advance value of the target uplink component carrier according to the dedicated preamble sequence. The third calculating unit 123 is configured to calculate a difference between the timing advance value of the target uplink component carrier and a timing advance value of the predetermined uplink component carrier. The determining unit 124 is configured to determine that, a target uplink component carrier with a difference greater than a second predetermined threshold cannot share a timing advance value with the predetermined uplink component carrier, and/or a target uplink component carrier with a difference not greater than the second predetermined threshold can share a timing advance value with the predetermined uplink component carrier.

The target uplink component carrier in the embodiment of the present invention is at least one target uplink component carrier, so that the base station performs TA value sharing judgment for multiple target uplink CCs.

In order to perform the TA value sharing judgment for a newly configured target uplink CC, the base station in the embodiment of the present invention further includes: a first configuring unit 1251, a first sending unit 1252, a first executing unit 1253, a first receiving unit 1254, a first deleting unit 1255, and a first recording unit 1256.

The first configuring unit 1251 is configured to, before the dedicated preamble sequence is detected, newly configure the target uplink component carrier for the user equipment. The first sending unit 1252 is configured to send a radio control resource connection reconfiguration message to the user equipment, where the radio control resource connection reconfiguration message includes resource information of the target uplink component carrier. The first executing unit 1253 is configured to execute a random access procedure with the user equipment on the target uplink component carrier. The first receiving unit 1254 is configured to receive a radio control resource connection reconfiguration complete message sent by the user equipment. The first deleting unit 1255 is configured to, after it is determined that the target uplink component carrier with the difference greater than the second predetermined threshold cannot share the timing advance value with the predetermined uplink component carrier, delete corresponding configuration of the target uplink component carrier with the difference greater than the second predetermined threshold. The first recording unit 1256 is configured to, after it is determined that the target uplink component carrier with the difference not greater than the second predetermined threshold can share the timing advance value with the predetermined uplink component carrier, record and use the target uplink component carrier with the difference not greater than the second predetermined threshold.

In order to perform the TA value sharing judgment for the newly configured target uplink CC, the present invention further provides another implementation manner. Specifically, the base station further includes: a second sending unit 1261, a second executing unit 1262, a second receiving unit 1263, and a second configuring unit 1264.

The second sending unit 1261 is configured to, before the dedicated preamble sequence is detected, send a radio control resource connection reconfiguration message to the user equipment, where the radio control resource connection reconfiguration message includes resource information of the target uplink component carrier. The second executing unit 1262 is configured to execute a random access procedure with the user equipment on the target uplink component carrier. The second receiving unit 1263 is configured to receive a radio control resource connection reconfiguration complete message sent by the user equipment. The second configuring unit 1264 is configured to, after it is determined that the target uplink component carrier with the difference not greater than the second predetermined threshold can share the timing advance value with the predetermined uplink component carrier, configure the target uplink component carrier with the difference not greater than the second predetermined threshold for the user equipment.

For a UE with already configured multiple uplink CCs, in the embodiment of the present invention, the predetermined uplink component carrier may be set to one uplink component carrier of the already configured uplink component carriers of the user equipment, and the target uplink component carrier is set to an uplink component carrier of the already configured uplink component carriers of the user equipment except the one uplink component carrier. Accordingly, an implementation manner of the base station further includes: a second detecting unit 1271, a third sending unit 1272, a third executing unit 1273, and a third receiving unit 1274.

The second detecting unit 1271 is configured to, before the dedicated preamble sequence is detected, detect data decoding on the target uplink component carrier. The third sending unit 1272 is configured to, when it is detected that the data decoding on the target uplink component carrier fails, send a radio control resource connection reconfiguration message to the user equipment, where the radio control resource connection reconfiguration message includes resource information of the target uplink component carrier. The third executing unit 1273 is configured to execute a random access procedure with the user equipment on the target uplink component carrier. The third receiving unit 1274 is configured to receive a radio control resource connection reconfiguration complete message sent by the user equipment.

Before detecting the data decoding, the base station in this embodiment may be further improved. Specifically, the base station further includes a third detecting unit 1275 and a fourth calculating unit 1276.

The third detecting unit 1275 is configured to, before the data decoding on the target uplink component carrier is detected, detect a timing advance adjustment value of the target uplink component carrier. The fourth calculating unit 1276 is configured to calculate an adjustment difference between the timing advance adjustment value of the target uplink component carrier and a timing advance adjustment value of the predetermined uplink component carrier. The determining unit 124 is further configured to determine that a target uplink component carrier with an adjustment difference greater than a third predetermined threshold cannot share a timing advance value with the predetermined uplink component carrier, and delete corresponding configuration of the target uplink component carrier with the adjustment difference greater than the third predetermined threshold. The second detecting unit 1271 is configured to, when none of adjustment differences corresponding to all the target uplink component carriers is greater than the third predetermined threshold, detect the data decoding on the target uplink component carrier.

The embodiment of the present invention may be executed after the user equipment is handed over to a target base station. Specifically, the predetermined uplink component carrier is one uplink component carrier, for example, a PCC, of uplink component carriers configured after the user equipment is handed over to the target base station, and the target uplink component carrier is an uplink component carrier of the uplink component carriers configured after the user equipment is handed over to the target base station except the one uplink component carrier.

The base station provided in this embodiment together with the user equipment may form a system for detecting sharing of a timing advance value. The user equipment is configured to execute the random access procedure with the base station on the target uplink component carrier. The base station in the system may complete detecting whether uplink component carriers can share the same TA value according to the random access procedure.

The base station provided in the embodiment of the present invention can judge whether the user equipment having multiple uplink component carriers can share a TA value, so that the base station performs corresponding processing, for example, deleting configuration of an uplink component carrier incapable of sharing the TA value, or not allowing an uplink component carrier incapable of sharing the TA value to be configured. Specifically speaking, the base station may directly calculate a TA value through the dedicated preamble sequence, and compare the TA value with a TA value of one of the component carriers, where a too large difference between the TA values indicates that the same TA value cannot be shared.

The base station provided in the embodiment of the present invention can judge whether multiple uplink component carriers can share a TA value, so that the base station performs corresponding processing, so as to enable the eNB to provide a normal service for the UE.

Message names or IE names in all of the foregoing embodiments of the present invention are merely names adopted for convenience of description, and the names cannot limit the application range of the embodiments of the present invention, that is, similar names may not exist in some systems, but it cannot be considered that the technical solutions in the embodiments of the present invention are inapplicable to the systems.

All of the foregoing embodiments of the present invention are mainly used in a wireless communication system, for example, a communication system such as 2G, 3G, or LTE.

Through the foregoing description of the embodiments, persons skilled in the art may clearly understand that the present invention may be accomplished by software plus necessary universal hardware, and definitely may also be accomplished by hardware, but in many cases, the former is a better implementation manner. Based on such understanding, the technical solutions of the present invention or the part that makes contribution to the prior art may be embodied in the form of a software product. The computer software product is stored in a readable storage medium, for example, a floppy disk, a hard disk, or a compact disk of the computer, and includes several instructions used to instruct a computer equipment (which may be a personal computer, a server, or network equipment and so on) to execute the methods according to the embodiments of the present invention.

The foregoing descriptions are merely specific implementation manners of the present invention. However, the protection scope of the present invention is not limited here. Any modification or replacement that may be easily thought of by persons skilled in the prior art within the technical scope of the present invention shall fall within the protection scope of the present invention. Therefore, the protection scope of the present invention is subject to the claims.

What is claimed is:

1. A method for detecting sharing of a timing advance value, the method comprising:
calculating, by a user equipment, a time offset between a downlink component carrier corresponding to at least one target uplink component carrier and a downlink component carrier corresponding to a predetermined uplink component carrier, wherein the downlink component carriers are adapted to carry wireless transmissions; and
sending, by the user equipment, an indication of the time offset between the downlink component carriers to a base station, the indication of the time offset configured to be used by the base station to identify which target uplink carriers are eligible to share timing advance values with the predetermined uplink component carrier, wherein target uplink component carriers with a time offset greater than a first predetermined threshold are deemed ineligible to share a timing advance value with the predetermined uplink component carrier, and wherein target uplink component carriers with a time offset less than or equal to the first predetermined threshold are deemed eligible to share a timing advance value with the predetermined uplink component carrier.

2. The method according to claim 1, wherein the predetermined uplink component carrier comprises a primary component carrier in one of a plurality of pre-configured uplink component carriers of the user equipment.

3. The method according to claim 1, wherein the target uplink component carrier comprises an uplink component carrier newly configured by the base station for the user equipment,
wherein the predetermined uplink component carrier comprises a pre-configured uplink component carrier of the user equipment, and
wherein the method further comprises:
before calculating the time offset, receiving a radio control resource connection reconfiguration message sent by the base station, wherein the radio control resource connection reconfiguration message comprises resource information of the newly configured uplink component carrier;
after receiving the indication of the time offset, recording, by the base station, the newly configured uplink component carrier which is successfully configured and with the time offset not greater than the first predetermined threshold; and
after receiving the indication of the time offset, canceling, by the base station, the newly configured uplink component carrier with the time offset greater than the first predetermined threshold.

4. The method according to claim 1, wherein the predetermined uplink component carrier comprises a first pre-configured uplink component carrier in a plurality of pre-configured uplink component carriers of the user equipment, wherein the target uplink component carrier comprises a second pre-configured uplink component carrier of the plurality of pre-configured uplink component carriers of the user equipment, the second pre-configured uplink component carrier being different than the first pre-configured uplink component carrier, and
wherein the method further comprises: after receiving the indication of the time offset, deleting, by the base station, configuration of the uplink component carrier with the time offset greater than the first predetermined threshold.

5. A method for detecting sharing of a timing advance value, the method comprising:
   detecting, by a base station, a dedicated preamble sequence adopted by a random access procedure executed with a user equipment on at least one target uplink component carrier;
   calculating, by the base station, a timing advance value of the target uplink component carrier according to the dedicated preamble sequence;
   calculating, by the base station, a difference between the timing advance value of the target uplink component carrier and a timing advance value of a predetermined uplink component carrier;
   determining, by the base station, that a target uplink component carrier with a difference greater than a second predetermined threshold cannot share a timing advance value with the predetermined uplink component carrier and/or a target uplink component carrier with a difference not greater than the second predetermined threshold can share a timing advance value with the predetermined uplink component carrier;
   before detecting the dedicated preamble sequence;
      newly configuring, by the base station, the target uplink component carrier for the user equipment,
      sending, by the base station, a radio control resource connection reconfiguration message to the user equipment, wherein the radio control resource connection reconfiguration message comprises resource information of the target uplink component carrier;
      executing the random access procedure with the user equipment on the target uplink component carrier;
      receiving a radio control resource connection reconfiguration complete message sent by the user equipment; and
   after determining that the target uplink component carrier with the difference greater than the second predetermined threshold cannot share the timing advance value with the predetermined uplink component carrier, deleting, by the base station, corresponding configuration of the target uplink component carrier with the difference greater than the second predetermined threshold.

6. The method according to claim 5, wherein the predetermined uplink component carrier comprises a primary component carrier in one of a plurality of pre-configured uplink component carriers of the user equipment.

7. The method according to claim 5, further comprising:
   after determining that the target uplink component carrier with the difference not greater than the second predetermined threshold can share the timing advance value with the predetermined uplink component carrier, configuring, by the base station, the target uplink component carrier with the difference not greater than the second predetermined threshold.

8. A method for detecting sharing of a timing advance value, the method comprising:
   detecting, by a base station, a dedicated preamble sequence adopted by a random access procedure executed with a user equipment on at least one target uplink component carrier;
   calculating, by the base station, a timing advance value of the target uplink component carrier according to the dedicated preamble sequence;
   calculating, by the base station, a difference between the timing advance value of the target uplink component carrier and a timing advance value of a predetermined uplink component carrier; and
   determining, by the base station, that a target uplink component carrier with a difference greater than a second predetermined threshold cannot share a timing advance value with the predetermined uplink component carrier and/or a target uplink component carrier with a difference not greater than the second predetermined threshold can share a timing advance value with the predetermined uplink component carrier, wherein the predetermined uplink component carrier comprises one uplink component carrier of the already configured uplink component carriers of the user equipment, and the target uplink component carrier comprises an uplink component carrier of the already configured uplink component carriers of the user equipment except the one uplink component carrier, and
   wherein before the detecting the dedicated preamble sequence, the method further comprises:
      detecting, by the base station, data decoding on the target uplink component carrier;
      when detecting that the data decoding on the target uplink component carrier fails, sending, by the base station, a radio control resource connection reconfiguration message to the user equipment, wherein the radio control resource connection reconfiguration message comprises resource information of the target uplink component carrier;
      executing, by the base station, the random access procedure with the user equipment on the target uplink component carrier; and
      receiving, by the base station, a radio control resource connection reconfiguration complete message sent by the user equipment.

9. The method according to claim 8, wherein, before the detecting the data decoding on the target uplink component carrier, the method further comprises:
   detecting, by the base station, a timing advance adjustment value of the target uplink component carrier;
   calculating, by the base station, an adjustment difference between the timing advance adjustment value of the target uplink component carrier and a timing advance adjustment value of the predetermined uplink component carrier;
   determining, by the base station, that a target uplink component carrier with an adjustment difference greater than a third predetermined threshold cannot share a timing advance value with the predetermined uplink component carrier, and
   deleting corresponding configuration of the target uplink component carrier with the adjustment difference greater than the third predetermined threshold,
   wherein detecting the data decoding on the target uplink component carrier comprises: when none of adjustment differences corresponding to all the target uplink component carriers is greater than the third predetermined threshold, detecting the data decoding on the target uplink component carrier.

10. A user equipment, comprising:
   a first calculating unit, configured to calculate a time offset between a downlink component carrier corresponding to at least one target uplink component carrier and a downlink component carrier corresponding to a predetermined uplink component carrier, wherein the downlink component carriers are adapted to carry wireless transmissions; and a sending unit, configured to send an indication of the time offset between the downlink component carriers to a base station, the indication of the time offset configured to be used by the base station to identify which target uplink carriers are eligible to share timing advance values with the predetermined uplink component carrier, wherein target uplink component carriers with a time offset greater than a first predetermined threshold are deemed ineligible to share a timing advance value with the predetermined uplink component carrier, and wherein target uplink component carriers with a time offset less than or equal to the first predetermined threshold are deemed eligible to share a timing advance value with the predetermined uplink component carrier.

11. The user equipment according to claim 10, wherein the predetermined uplink component carrier comprises a primary component carrier in one of a plurality of pre-configured uplink component carriers of the user equipment.

12. The user equipment according to claim 10, wherein the target uplink component carrier comprises a newly configured uplink component carrier that was dynamically configured by the base station for the user equipment,
   wherein the predetermined uplink component carrier comprises one of a plurality of pre-configured uplink component carrier of the user equipment,
   wherein the user equipment further comprises: a receiving unit, configured to receive a radio control resource connection reconfiguration message sent by the base station before the time offset is calculated, wherein the radio control resource connection reconfiguration message comprises resource information of the newly configured uplink component carrier,
   wherein the base station is configured to, after receiving the indication of the time offset, record the newly configured uplink component carrier which is successfully configured and is with the time offset not greater than the predetermined threshold, and
   wherein the base station is further configured to, after receiving the indication of the time offset, cancel configuring the newly configured uplink component carrier with the time offset greater than the first predetermined threshold.

13. The user equipment according to claim 10, wherein the predetermined uplink component carrier comprises a first pre-configured uplink component carrier in a plurality of pre-configured uplink component carriers of the user equipment,
   wherein the target uplink component carrier comprises a second pre-configured uplink component carrier of the plurality of pre-configured uplink component carriers of the user equipment, the second pre-configured uplink component carrier being different than the first pre-configured uplink component carrier, and
   wherein the base station is further configured to, after receiving the indication of the time offset, delete corresponding configuration of the uplink component carrier with the time offset greater than the first predetermined threshold.

14. The method according to claim 5, further comprising:
   before detecting the dedicated preamble sequence, newly configuring, by the base station, the target uplink component carrier for the user equipment; and
   after determining that target uplink component carrier with the difference not greater than the second predetermined threshold can share the timing advance value with the predetermined uplink component carrier, recording and using the target uplink component carrier with the difference not greater than the second predetermined threshold.

* * * * *

UNITED STATES PATENT AND TRADEMARK OFFICE
CERTIFICATE OF CORRECTION

PATENT NO. : 8,953,541 B2
APPLICATION NO. : 13/609045
DATED : February 10, 2015
INVENTOR(S) : Yi Jiang et al.

Page 1 of 1

It is certified that error appears in the above-identified patent and that said Letters Patent is hereby corrected as shown below:

On the Title Page, item (12), line 2, delete "Jang et al." and insert --Jiang et al.--.
On the Title Page, item (75) Inventors, line 1, delete "Yi Jang, Beijing (CN); Meylan Arnuad," and insert --Yi Jiang, Beijing (CN); Arnaud Meylan,--.

Signed and Sealed this
Twelfth Day of May, 2015

Michelle K. Lee
*Director of the United States Patent and Trademark Office*